UNITED STATES PATENT OFFICE.

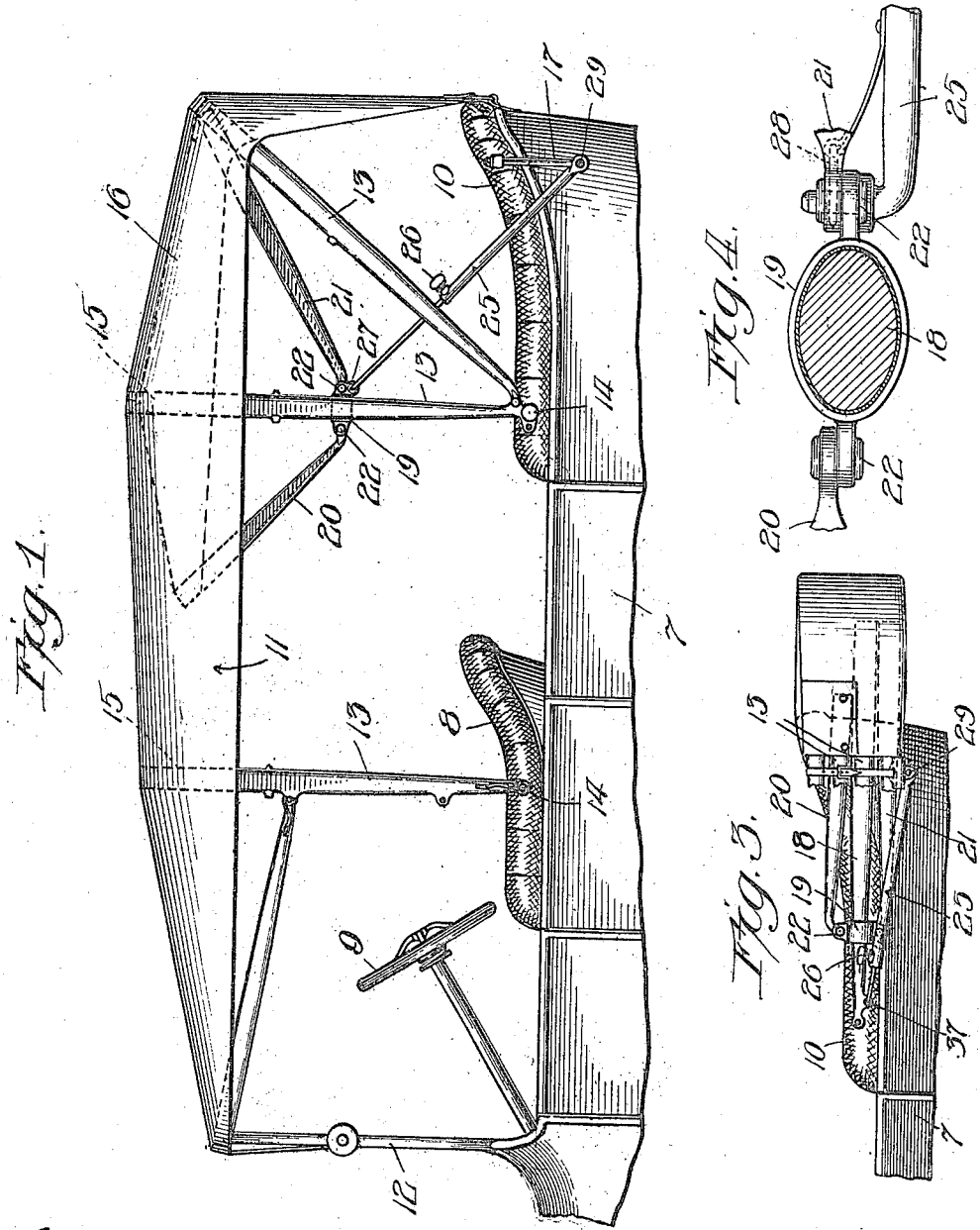

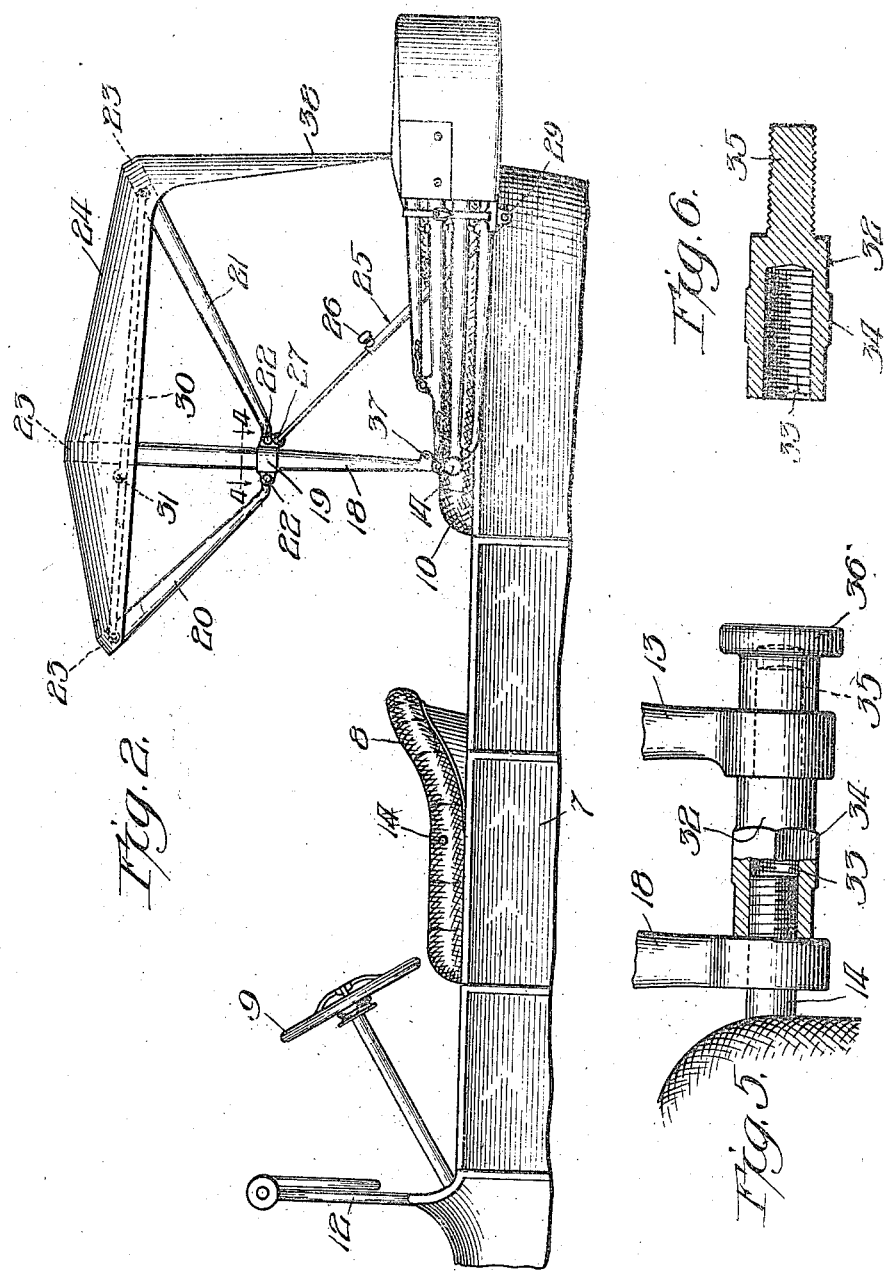

JOSEPH W. RUSSELL, OF CHICAGO, ILLINOIS.

VEHICLE-TOP.

1,249,208.	Specification of Letters Patent.	Patented Dec. 4, 1917.

Application filed May 15, 1916. Serial No. 97,707.

*To all whom it may concern:*

Be it known that I, JOSEPH W. RUSSELL, a citizen of the United States, residing at Chicago, county of Cook, and State of Illinois, have invented certain new and useful Improvements in Vehicle-Tops, of which the following is a specification.

This invention relates to a top for vehicles, such as automobiles and the like, and is intended primarily for use in conjunction with the ordinary folding top usually provided on such vehicles.

Among the objects of my invention is the construction of a supplementary top which is light, easily adjusted, and inexpensive to manufacture; a top which affords protection against the sun without shutting off the view or fresh air; a top arranged for use upon the vehicle without interference with the main folding top usually provided; and a top so arranged, constructed, and proportioned as to occupy but little space when not in use, and to be not unsightly when in use. The invention consists further in numerous other features of construction and combinations of parts as will more fully hereinafter appear.

In the drawings:

Figure 1 is a side elevation of an automobile body equipped with the usual top, the supplementary top of my invention being shown erected;

Fig. 2 is a view similar to Fig. 1, showing the main top folded down, and the supplementary top alone in use;

Fig. 3 is a detail of the rear end of the vehicle showing both tops folded down;

Fig. 4 is a section through the main socket of the supplementary top, taken on line 4—4 of Fig. 2;

Fig. 5 is a detail, partly in section, showing one of the rear props and thimbles upon which the sockets are mounted; and Fig. 6 is a longitudinal section through the thimble shown in Fig. 5.

Vehicle tops are ordinarily arranged to cover both front and rear seats of the vehicle body. The entire top must be erected even if only for protection against the heat of the sun, thus shutting off considerable of the view, and preventing the free circulation of air beneath the top. Oftentimes the occupant of the front seat will not desire to have the top erected, whereas those in the rear seat will wish otherwise. These various objectionable features are common to nearly all vehicle tops. In order to overcome such objections inherent in the use of a main top, I have devised an improved construction which forms the subject matter of the present invention.

Referring more particularly to the drawings, I have shown in Fig. 1 an automobile body 7 having a driver's seat 8 in proximity to the wheel and controls 9, and a rear seat 10 situated in the tonneau of the vehicle. An ordinary top 11 is shown as mounted upon the vehicle, extending from the wind shield 12 at the front end thereof to the rear end of the vehicle. This top consists of the usual sockets 13, pivotally mounted upon props 14 and supporting bows 15 over which the covering material 16 is stretched. Drop irons 17 are provided near the rear end of the vehicle to receive the sockets when the top is folded down.

The top of the present invention is arranged to lie within and under the top 11 just described, and consists of a main socket 18 pivotally mounted upon the prop 14 adjacent the rear seat, a sleeve 19 being slidingly arranged upon the socket to support forward and rearward supplementary sockets 20 and 21 respectively, each of which is pivotally joined to the sleeve as at 22. The sockets 18, 20 and 21 support bows 23 to which the covering material 24 is secured. The sleeve 19 is locked at any desired point of elevation upon the socket 18 by means of a telescoping rod 25, the parts of which may be secured against longitudinal movements by means of a thumb nut 26. This telescoping rod is removably attached to an eye 27 formed upon the sleeve 19, a cotter pin 28, or similar fastening device, being used to prevent its accidental detachment. The other end of the telescoping rod is secured to the drop iron 17 as at 29. To stretch the covering taut and hold the two sockets 20 and 21 apart, joints 30 are provided each arranged to break as at 31 (see Fig. 2). It will be understood, of course, that the sockets, props, etc., upon one side of the vehicle are duplicated upon the other, so that description of but one set of parts is necessary.

The socket 18 of my supplementary top is secured to the prop 14 at a point inwardly of the socket 13, as shown in Fig. 5. In order to provide a proper mounting for each of these sockets, I utilize a thimble 32 threaded on its interior as at 33 to connect with the prop 14 and having an exterior configuration, as at 34, to be engaged by a wrench or similar instrument. The outer end of the thimble is provided with a threaded stem 35 to which the socket 13 and prop nut 36 may be secured. When arranged in the manner shown in Fig. 5, the socket 18 is pivoted directly upon the prop 14, while the socket 13 is supported upon the extension bearing provided by the stem 35. In this manner both the sockets 18 and 13 are spaced a fixed distance apart, such as to enable the two tops to be folded or unfolded without the sockets of each interfering with the sockets of the other. Close to the lower end of the socket 18 an eye 37 is provided for purposes to be hereinafter explained. When both tops are folded down, as shown in Fig. 3, (a portion of the sockets of the main top being broken away for the sake of clearness) the supplementary top will lie wholly within the main top. To fold the supplementary top, the thumb nut 26 is first loosened to permit the telescoping rod 25 to shorten. The pin 28 is then withdrawn so that the rod may be detached from the eye 27, and be transferred to lie within the eye 37, as shown in Fig. 3. By this means the telescoping rod is securely locked in position against displacement.

To erect the supplementary top the telescoping rod is first removed from the eye 37, after which the socket 18 is brought to a vertical position, and the sleeve 19 raised to stretch the covering material taut. The joint 30 is then brought into alinement to hold the sockets 20 and 21 apart. The telescoping rod is then locked within the eye 27 to sustain the socket 18 in a substantially vertical position. A rear curtain 38 may be attached if desired, as shown in Fig. 2, to afford additional protection. Manifestly the top may be adjusted to a desired position either forwardly or rearwardly of that shown in Fig. 2, simply by adjusting the length of the rod 25. As the top is light and compact, and the adjusting mechanism is simple, these shifting operations are easily performed.

The main top whose sockets lie outside of the sockets of the supplementary top may be erected in the usual manner without interference with the supplementary top. If necessary, to provide clearance for the erection of the main top, the supplementary top may be dropped forwardly to a point where the bow carried by the socket 21 will not interfere with the main top, after which the supplementary top may be returned to the position shown in Fig. 1.

From the foregoing description, it will be apparent that the top of my invention is of simple construction, and is readily capable of adjustments to suit various requirements of use. It may be used in conjunction with the ordinary top and without interference therewith. To mount it in position no changes in the construction of the vehicle body are required, the thimble alone affording the double mounting requisite for both tops.

I claim:

1. The combination with a vehicle body having props secured thereto and sockets mounted on the props for supporting a main top, of a second top arranged within the main top and consisting of a pair of main sockets carrying a bow therebetween and mounted on the main top props, a sleeve slidingly arranged upon each socket, two pairs of sockets secured to the sleeves, one forwardly and one rearwardly of the main pair of sockets and obliquely disposed relatively thereto, there being a bow carried by each of the two latter pair of sockets, means for holding the forward and rearward pair of sockets apart at a fixed distance, whereby the sleeves are prevented from moving upon the main sockets, a covering material stretched across the bows, and means for locking the second top in any selected angular position longitudinally of the vehicle body, substantially as described.

2. The combination with inner and outer vehicle tops and sockets therefor arranged respectively inwardly and outwardly of each other, of props for supporting the sockets, each prop embodying a main threaded portion secured to the vehicle body arranged to form a mounting for an inner socket, a hollow thimble threaded interiorly to engage with the main prop portion and to lock the inner socket in place thereupon, the thimble having a threaded stem at its outer end to form a mounting for an outer socket, and means for locking the outer socket in place upon the thimble, substantially as described.

JOSEPH W. RUSSELL.

Witnesses:
 EPHRAIM BANNING,
 FRANCES M. FROST.